June 21, 1949.  H. BENIOFF  2,473,779
PICKUP LOOP WITH THERMOCOUPLE
Filed March 10, 1945

INVENTOR.
HUGO BENIOFF
BY Ezekiel Wolf
his attorney

Patented June 21, 1949

2,473,779

UNITED STATES PATENT OFFICE 2,473,779

PICKUP LOOP WITH THERMOCOUPLE

Hugo Benioff, Pasadena, Calif., assignor, by mesne assignments, to Submarine Signal Company, Boston, Mass., a corporation of Delaware Application March 10, 1945, Serial No. 581,990

2 Claims. (Cl. 136—4)

The present invention relates to a device for receiving electromagnetic energy of ultra high radio frequencies and more particularly relates to a pickup loop or receiver which may be used in connection with a wave meter or other type of detector or testing apparatus.

The present invention is simple in construction and rugged and of such a small size that it can readily be used in and around ultra high frequency apparatus.

In the present device a loop which may be in ring or other form is closed by one element of a thermocouple, the other element and its connecting lead being preferably symmetrically positioned with reference to the loop and parallel to the plane of the loop. The whole device may be contained in a vacuum tube of dimensions of about one-quarter of an inch in diameter and one and one-eighth inch in its longest dimension from which it will be seen that the unit may be used in very small places within cavity resonators as well as outside for various purposes for which such units are generally used.

Figure 1:
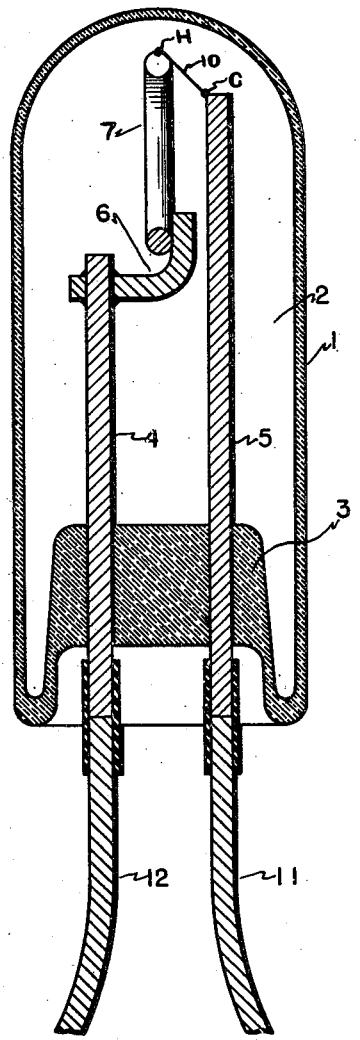
Figure 2:
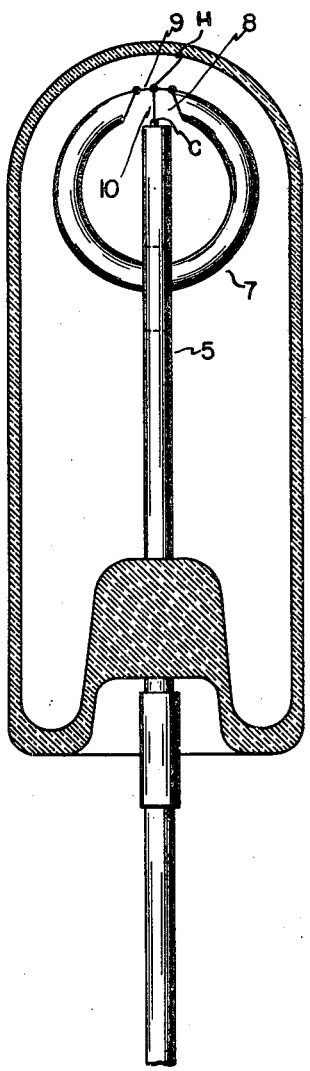

The invention will be further described in connection with the drawings illustrating an embodiment of the same in which Fig. 1 shows a sectional view in one elevation and Fig. 2 shows a section taken at right angles to the section of Fig. 1 in the same elevation.

In the drawings, 1 is a glass envelope enclosing an evacuated space 2. The glass envelope is provided with a heavy base 3 through which two metallic posts 4 and 5 are wrought. These posts which are rigidly supported in the base 3 may be made of molybdenum or other such similar metal as, for instance, tungsten or platinum. On one of the posts 4 there is welded an angle bracket 6 to which the circular pickup loop 7 may be welded, the circular loop being made in some conductive metal as, for instance, copper or beryllium copper. The loop 7 is attached to the bracket 6 at its lower end as viewed in Fig. 1, while the diametrically opposite portion is open as indicated at 8, Fig. 2. The thermocouple loop which comprises the wires 9 and 10 is placed in the open section of this loop. Wire 9 is connected between the ends of the pickup loop 7, and wire 10 is connected between a point H on wire 9 intermediate the ends thereof and a point C on the free end of post 5. The connection points H and C are the hot and cold junctions, respectively, of the thermocouple. The wire 9, which may be of Nichrome V, an alloy of approximately 80% nickel and 20% chromium, may be of a diameter of 0.0005 of an inch while the joining wire 10 forming the T in the thermocouple junction may be of the type called "advance," an alloy of approximately 60% copper and 40% nickel and of a diameter of 0.00065 of an inch. Any other thermocouple wires may be provided that can be drawn into sufficiently fine wire and provide the necessary thermo E. M. F. to create electric current. It will be noted in this case that the Nichrome wire 9 is both the heating wire and one leg of the thermocouple. The thickness of the wire of the loop 7 is considerably larger than that of the thermocouple wires. This may be of the order of 0.005 of an inch in thickness or greater.

The post 5, it will be noted, is aligned with the vertical diameter of the loop, and the thermocouple element 10 forming the T of the thermocouple is joined to the middle of the thermocouple wire 9, thus providing symmetrical construction both for the pickup loop and for the thermocouple itself. The loop is constructed so as not to be resonant for the frequencies for which it is intended to be used. This is controlled by choosing the proper size of the pickup loop 7. The ring 7 acts as a pickup loop to receive radiant energy which may be in the vicinity in which the exploring device is positioned. This radiant energy generates a high frequency current in thermocouple wire 9, causing a rise in temperature at the hot junction H. This established a direct current in the thermocouple which flows through the other wire 10 of the thermocouple, the circuit of which is completed through the posts 4 and 5 and the external flexible leads 11 and 12 which may be connected to an indicator apparatus, or to any suitable electrical indicating circuit.

Having now described my invention, I claim:

1. A device for measuring the intensity of electromagnetic wave energy of high frequency comprising: an evacuated vessel; two conductive supports extending through and into the vessel; a conductive ring having an open segment, the ring being supported at a point opposite said open segment by one of said supports; a thermocouple having the first of its dissimilar wires connected in the ring across the open segment and the second of its wires connected at one end to said first wire intermediate the ends thereof and at the other end to the end of the other of said supports, said other support terminating very close to said open segment, whereby the thermocouple wires are maintained very short.

2. A device for measuring the intensity of electromagnetic wave energy of high frequency comprising: an evacuated vessel; two parallel conductive supports, one of which is longer than the other, extending through and into the vessel; a conductive ring having an open segment, the ring being supported at a point opposite said open segment by the shorter one of said supports; in a plane parallel to said supports, said open segment being disposed near the end of the other of said supports; a thermocouple having the first of its dissimilar wires connected in the ring across the open segment and the second of its wires connected at one end to said first wire intermediate the ends thereof and at the other end to the end of the other of said supports, whereby the thermocouple wires are maintained very short.

HUGO BENIOFF.

REFERENCES CITED

The following references are of record in the file of this patent:

UNITED STATES PATENTS

| Number | Name | Date |
| --- | --- | --- |
| 1,259,363 | Chubb | Mar. 12, 1918 |
| 1,291,409 | Chubb et al. | Jan. 14, 1919 |
| 1,893,748 | Klopsteg | Jan. 10, 1933 |
| 2,192,321 | Meier | Mar. 5, 1940 |
| 2,430,664 | Bradley | Nov. 11, 1947 |
| 2,365,207 | Moles | Dec. 19, 1944 |